Sept. 6, 1955 W. A. OGLETREE 2,717,311

SIMPLIFIED BINARY ADDER AND MULTIPLIER CIRCUIT

Filed Dec. 13, 1952

INVENTOR.
WILLIAM A. OGLETREE
BY
Brown, Denk & Synnestvedt
AGENTS

United States Patent Office 2,717,311
Patented Sept. 6, 1955

2,717,311

SIMPLIFIED BINARY ADDER AND MULTIPLIER CIRCUIT

William A. Ogletree, Southampton, Pa., assignor to Philco Corporation, Philadelphia, Pa., a corporation of Pennsylvania Application December 13, 1952, Serial No. 325,818
4 Claims. (Cl. 250—27)

This invention relates to signal comparator circuits and more particularly to signal comparator circuits of the binary adder and binary multiplier types.

In the fields of military electronics, industrial control and digital computors, many instances are found when it is necessary to compare two bivalued signals and to receive one indication if the two signals have the same value and to receive a second indication if the two signals have different values. For example, circuits known in the art as binary adders compare signals having the values one and zero and produce one indication if both signals are one or zero and a second indication if one signal is one and the other zero. In certain other instances, it is necessary to compare two bivalued signals and to provide one indication if both of the signals have one particular value and a second indication if either or both of the two original signals have the opposite value. Circuits of this type are known in the art as binary multiplier circuits. One form of binary adder circuit in current use employs six triode vacuum tubes, fifteen resistors and five capacitors. A typical computing circuit may employ anywhere from 20 to 100 of such binary adder circuits. One of the most difficult problems encountered in the design of a computing system is the dissipation of heat given off by the numerous vacuum tubes in the system. Therefore any reduction in the number of vacuum tubes employed in a binary adder circuit will contribute materially to the reduction in heat to be dissipated in a computer or similar circuit. Another very important consideration in the design of computer circuits is reliability. It is generally recognized that a reduction in the number of circuit components will increase the reliability of a circuit provided the changes introduced by this reduction of circuit components does not adversely affect the nature of the electrical signals produced by the various circuits. Many of the circuit elements included in a conventional binary adder circuit serve no other function than to provide interstage coupling between the many vacuum tube stages.

Therefore it is an object of the present invention to provide an improved circuit of the binary adder type.

It is a further object of the present invention to provide an improved circuit of the binary adder type which employs fewer electron tubes and fewer circuit components than circuits of a similar nature known to the prior art.

A further object of the present invention is to provide a simple circuit which will function both as a binary adder and as a binary multiplier.

It is a further object of the invention to provide a binary adder circuit which will operate with filamentary type vacuum tubes.

Still another object of the invention is to provide a binary adder circuit which does not require interstage coupling networks.

The preferred embodiment of the invention comprises two pentode amplifier stages having a common anode load impedance and two triode or pentode inverter stages.

One input signal is applied directly to one inverter stage and one pentode amplifier stage while the other signal is applied to the other inverter stage and the other pentode amplifier stage. The output of the first-mentioned inverter stage is supplied to a second input of the second-mentioned amplifier stage and, similarly, the output of the second inverter stage is supplied to a second input of the first pentode amplifier stage. A negative signal at either input of a pentode amplifier stage causes anode current cut-off in that stage. In a simplified embodiment of the invention the two inverter stages are omitted and signals of opposite value or polarity are supplied by circuits associated with the binary adder.

For a better understanding of the invention together with other and further objects thereof, reference should now be made to the following detailed description which is to be read in conjunction with the accompanying drawings in which.

Figure 1:
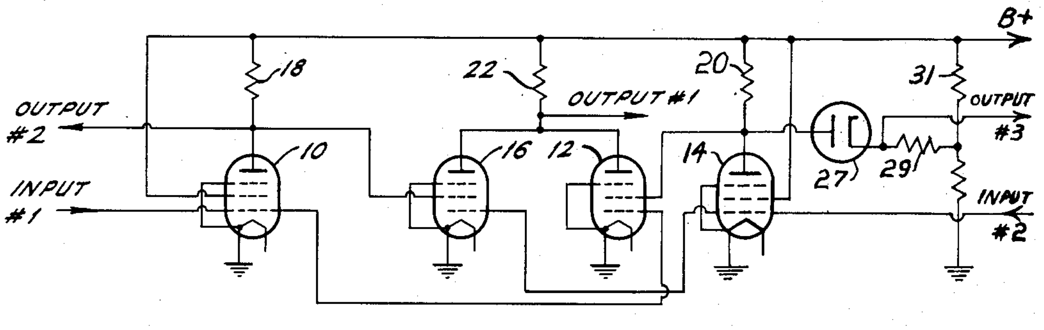
Fig. 1 is a schematic diagram of one preferred form of the present invention.

In Fig. 1, the first input circuit, identified by the legend "Input #1," is connected to the control grid of the electron tube 10, which forms a part of an inverter stage, and to the control grid of a pentode vacuum tube 12. The second input circuit, identified in Fig. 1 as "Input #2," is connected to the control grid of a vacuum tube 14, which forms a part of the second inverter stage, and to the control grid of a second pentode tube 16. Vacuum tubes 10, 12, 14 and 16 may have filamentary type cathodes as shown in Fig. 1 or indirectly heated cathodes, either of these types being well known in the prior art. If several hundred tubes are to be employed in a confined space, it will be found that a considerable reduction in the heat to be dissipated can be achieved by employing tubes having filamentary type cathodes. One side of the filamentary cathode, or preferably the center tap, if available, is connected to the negative terminal of the anode supply, schematically shown in Figs. 1 and 2 by the ground symbol. In the circuits shown in Figs. 1 and 2, the filamentary cathodes may be heated with alternating current provided the center tap of the filament or of the transformer winding supplying the filament is grounded since any ripple in the output signal caused thereby will not be of sufficient magnitude to adversely affect the operation of the circuits. The source of energy for heating the filaments of the vacuum tubes is not shown in Fig. 1 since the connection of such a source to a vacuum tube is well known in the art.

The anodes of tubes 10 and 14, respectively, are connected to the positive terminal of the source of anode supply potential, schematically represented by the symbol B+, through resistors 18 and 20. The amplitude of the anode supply potential will depend upon the types of tubes selected. However, it is suggested that an anode potential of 24 volts is satisfactory for vacuum tubes identified by the Raytheon Manufacturing Company type Number CK5672. The primary function of the circuits including the vacuum tubes 10 and 14 is to invert or change the value of the two bivalued input signals applied to their respective control elements. Therefore, the screen grids and the suppressor grids of tubes 10 and 14 may be connected in any manner commonly employed in the construction of such inverter stages but it has been found that tubes of the type mentioned above give optimum performance at low anode supply potentials if the screen grids are returned directly to the anode supply. The suppressor grids of tubes of this type are internally connected to the cathode. Tubes 10 and 14 may be replaced by tubes of other types, either triode or pentode, without departing from the invention.

The anodes of pentode tubes 12 and 16 are connected together and returned to the positive terminal of the anode potential supply through a resistor 22. The values of resistors 18, 20 and 22 will depend upon the anode supply potential and the types of tubes selected for a particular physical embodiment of the invention. A value of 22,000 ohms is suggested as suitable for an anode potential of 24 volts when type CK5672 tubes are employed. If the values suggested above are employed, the anode of tube 10 may be connected directly to the screen grid of tube 16 and the anode of tube 14 may be connected directly to the screen grid of tube 12 as shown in Fig. 1. One advantage of the present invention is that no coupling networks are required between the anodes of tubes 14 and 10 and the screen grids of tubes 12 and 16. However, it is within the scope of the present invention to employ different values of anode potentials or load resistors or to replace tubes 12 and 16 with a type of tube having a double control grid or a free suppressor grid. If such substitutions are made, appropriate coupling networks and bias sources should be inserted between the anode of tubes 10 and 14 and the appropriate grids of tubes 12 and 16.

The output signal representing the binary addition of the two input signals is obtained from the common anode connection of tubes 12 and 16, which is designated in Fig. 1 as "Output #1." A signal representing the binary multiplication of the two input signals may be obtained from the anode of tube 10 or the anode of tube 14. These points are designated as "Output #2" and "Output #3" in the schematic diagram of Fig. 1.

Figure 3:
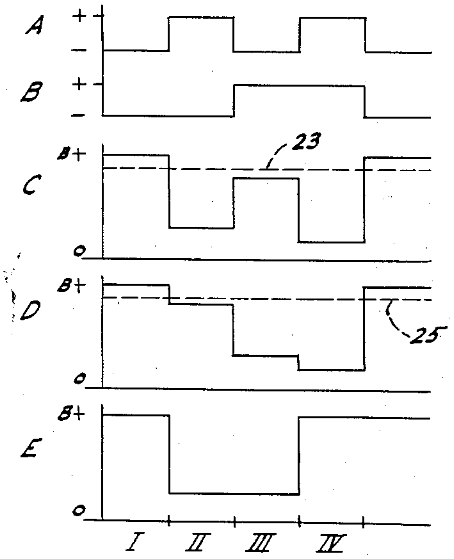
Fig. 3 is a series of waveforms showing typical voltages appearing at various points in the circuit of Fig. 1.

For a better understanding of the operation of the binary adder circuit of Fig. 1, reference should now be made to Fig. 3. In describing the operation of the circuit of Fig. 1, it will be assumed that a voltage having the waveform shown at A in Fig. 3 is supplied to input #1 and that a voltage having a waveform shown at B in Fig. 3 is supplied to input #2. It will be noted that waveforms A and B have only two values designated as positive and negative (+ and −) in Fig. 3. The value designated as negative (−) may be any value that will cause anode current cut-off in tubes 10, 12, 14 and 16 when applied to the control grids thereof. The value designated as positive (+) may be any value that will cause tubes 10 and 14 to conduct heavily when applied to the control grids thereof and that will cause a similar heavy conduction in tubes 12 and 16 provided the screen grids of these tubes are at or near the anode supply potential. Any signal exceeding these two values on the positive and negative excursions thereof may be considered to be a bivalued signal so far as the present invention is concerned. Therefore, the term "bivalued signal," as used in the claims, should be construed as including all signals having alternate positive and negative portions exceeding these two values regardless of what modulation or other variation in potential may be present in the signals at levels in excess of these two values.

There are four possible combinations of two signals having two values each. These four combinations are shown in succession in Fig. 3 in the time intervals designated by the Roman numerals I through IV. Since the circuit of Fig. 1 does not involve any resistor-capacitor coupling networks, the frequency at which the signals change from one value to another at either of the inputs has very little effect upon the operation of the circuit. Therefore, the fact that the 4 time intervals are shown as being equal should not be construed as limiting the invention to waveforms of having equal positive and negative intervals. In certain applications of the embodiment shown in Fig. 1, the signal supplied to one or both of the inputs may remain at one value for a long period, for example several seconds or several minutes, or it may change from one value to the other several times within one second. Therefore the waveforms A and B of Fig. 3 represent signals characterized by having two possible values but no definite waveshape. The signals appearing at outputs #1, #2 and #3 are shown in waveforms C, D and E, respectively, in Fig. 3. Again the signals illustrated at C, D and E of Fig. 3 have definite values, depending upon the values of the signals supplied at inputs #1 and #2, but no definite waveshape since correspondence between the signals supplied to inputs #1 and #2 may occur at irregular intervals and for irregular times.

Considering first the condition of the circuit during interval I, it will be seen that the control grids of all four tubes are negative so that all tubes will be completely cut off regardless of the signal applied to the screen grids of tubes 12 and 16. This being so, the signals at outputs #1, #2 and #3 will be at the potential equal to the anode supply potential.

During the interval II, tubes 14 and 16 are cut off by the negative signal supplied to the control grids. The positive signal supplied to the control grid of tube 10 causes the anode to drop in potential as shown in waveform C of Fig. 3. This drop in potential at the anode of tube 10 causes the screen grid of tube 16 to be sufficiently negative to cut off tube 16. Since tube 14 is cut off, the anode of this tube is at the anode supply potential except for a small drop in potential caused by screen grid current flowing in tube 12. This drop in potential caused by screen grid current flowing through resistor 20 is shown in waveform D. However, this drop in screen potential is not sufficient to cut off tube 12. The positive signals on the control grid and the screen grid cause tube 12 to conduct heavily. The conduction through tube 12 results in a drop in potential at the anode of this tube as shown in waveform E of Fig. 3.

During the third interval, designated as interval III in Fig. 3, the signal at input #1 is negative and the signal at input #2 is positive. Since the circuit is symmetrical, the state of conduction of the various tubes may be determined by substituting tube 10 for tube 14 and tube 16 for tube 12 in the description relating to interval II immediately above.

During the interval IV, a positive signal is supplied to input #1 and input #2. Under these conditions, a positive signal is present on the control grids of all four tubes. The positive signal on the control grid of tube 10 causes the anode potential of this tube to be at a low value due to the drop across the resistor 18 when tube 10 conducts. The potential at the anode of tube 10 is further reduced by the fact that tube 16 has a positive potential on its control grid thereby permitting screen grid current for tube 16 to be drawn through resistor 18. As a result, the potential at the anode of tube 10 will be slightly lower during interval IV than it was at interval II when no screen grid current was drawn by tube 16. Similarly the potential at the anode of tube 14 will be held at a low value due to the conduction of tube 14 and the screen grid current drawn by tube 12. The difference between the potential at the anode of tube 10 during intervals II and IV will be less than the difference between the potential at this point during intervals I and III owing to the fact that the screen grid of tube 16 draws less current at its low potential than it does when it is approximately at the anode supply potential. The low screen grid voltages on tubes 12 and 16 cause anode current cut-off in these tubes. Since no current is drawn through resistor 22, the signal at output #1 is equal to the potential of the anode supply. In the examples given above it has been assumed that anode current in tubes 12 and 16 is completely cut off by the negative signal on the screen grid. In actual practice it was found that a value of 22,000 ohms for resistors 18 and 20 reduced the anode current to a negligible amount and that a value of 33,000 ohms would completely cut off anode current flow.

Summarizing the operation of the circuit for the four intervals mentioned above, during interval I, tubes 12 and 16 are cut off by negative potentials on the control grid causing the anodes of these tubes to be at the potential of the anode supply. During interval IV, tubes 12 and 16 are cut off by negative signals on the screen grids again causing the anodes of these tubes to be at the potential of the anode supply. During interval II, tube 12 conducts thereby lowering the potential at output #1, and during interval III, tube 16 conducts again lowering the potential at output #1 by the same amount. A comparison of waveforms A, B and E will show that the potential at output #1 is high when the signals at inputs #1 and #2 are of like polarity, either positive or negative, and the signal at output #1 is low when the signals at inputs #1 and #2 are of different polarity. Therefore, the signal at output #1 corresponds to the binary sum of input signals #1 and #2.

A consideration of waveforms C and D will show that if these waveforms are passed through a suitable clipping circuit so that only the portions above the broken lines 23 and 25 of Fig. 3 are passed, then these clipped waveforms will have a positive value when both of the signals at inputs #1 and #2 are negative. The signal will have a negative value when either or both of the signals at inputs #1 and #2 are positive. Therefore these signals correspond to the binary product of the signals at inputs #1 and #2. It should be remembered that the binary product of two positive numbers is negative rather than positive as in the case of conventional algebraic multiplication. A suitable circuit for performing the clipping function mentioned above is a voltage level detector circuit which comprises a diode vacuum tube 27 having a load resistor 29 in the cathode circuit thereof. The anode of diode 27 is connected to the anode of tube 14. The cathode of diode 27 is biased at the positive potential indicated by the broken line in waveform C or D by the potential divider 31. A selenium or germanium diode of appropriate type may be substituted for the diode vacuum tube if desired.

By careful control of the clipping level, it would be possible to distinguish between the amplitudes at the anode of tube 10 during intervals II and IV and thus obtain a signal which indicates when both of the input signals have positive values. However, as mentioned above, there is not as great a difference between the potentials at the anode of tube 10 during the intervals II and IV as there is during intervals I and III.

In the example given above, the signal at inputs #1 and #2 could have only two possible values, either positive or negative. It can be shown that the circuit of Fig. 1 will operate to compare the polarity of short duration pulses where the signal at each input may have three values, namely, a positive pulse, zero or a negative pulse. The signal at output #1 will again be positive if the pulses simultaneously applied at inputs #1 and #2 are of the same polarity, either positive or negative, and will be negative if the pulses simultaneously applied to inputs #1 and #2 are of opposite polarity. During the interval that no signal is supplied to these inputs, that is in the interpulse intervals, the potential at output #1 will be at some intermediate value depending upon the characteristics of the four tubes. The combination of two signals each having three possible states will give rise to nine different possible conditions of operation of the circuit of Fig. 1. Five of these conditions have already been described. These five conditions are: no signal applied to either input, two conditions in which signals of like polarity are applied to the inputs, and two conditions in which signals of opposite polarity are applied to the input. The other four conditions are: a positive signal applied to input #1 with no signal at input #2, a negative signal at input #1 with no signal at input #2, a positive signal at input #2 with no signal at input #1, and a negative signal at input #2 with no signal at input #1. If the circuit coupled to the output #1 can discriminate between only two amplitude levels, the signal appearing at output #1 will clearly indicate when pulses of like polarity are supplied to the two inputs, but a signal at the second level will indicate that one of three possible conditions exists—namely, that no pulses are being supplied to either input, that a pulse is being supplied to only one input, or that pulses of unlike polarity are being supplied to the two inputs. Generally this information will be sufficient for most signal comparator circuits since it is usually desirable to provide a signal of one characteristic when the two input signals are present and alike, and to provide a second signal of a different characteristic when both input signals are absent or are unlike in any respect. If the circuit connected to output #1 will recognize five different amplitude levels, it is possible to indicate these five conditions: both signals present and alike, both signals present but of unlike polarity, no signal present, a negative signal present at one of two inputs and no signal at the other input, and a positive signal present at one input and no signal at the other input. It is recognized that the use of a five level discriminator connected to output #1 may not be the most expeditious way of deriving this information. However, the above explanation has been given in order to point out that the application of the present invention is not limited to systems providing signals in the form shown in Fig. 3. The term bivalued signal, as used in the claims should be construed as covering the signals shown at A and B of Fig. 3, signals made up of recurring pulses which are always upresent but which may be either positive or negative in value, and other signals which, when applied to the two inputs, cause the circuit of Fig. 1 to operate in the manner described above.

Figure 2:
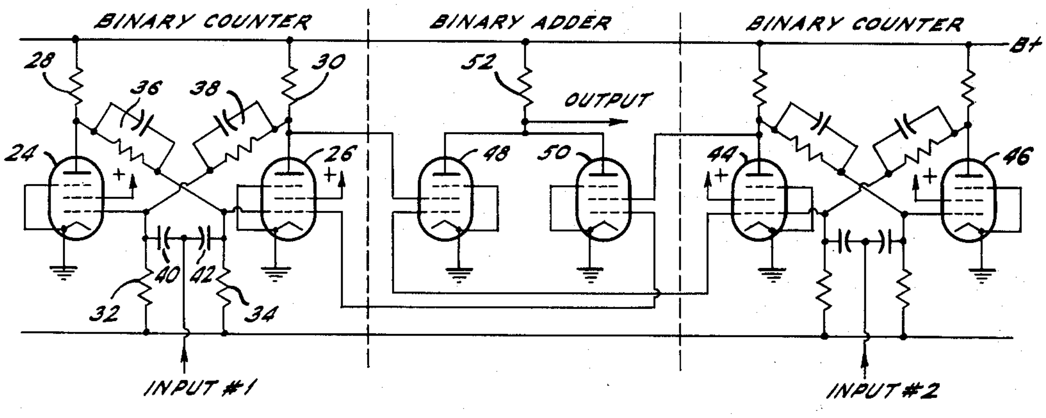
Fig. 2 is a schematic diagram of a simplified embodiment of the present invention and two associated binary countercircuits.

The circuit shown in Fig. 2 comprises two binary-counter or Eccles-Jordan counter circuits which are energized by pulses supplied by way of inputs #1 and #2. The Eccles-Jordan circuit supplied by input #1 comprises two pentode tubes 24 and 26 which may have the same characteristics as the pentode tubes shown in Fig. 1. The cathodes of tubes 24 and 26 are returned directly to ground and the anodes are returned to the positive terminal of the anode supply source through suitable resistors 28 and 30. The screen grids are returned to a positive voltage, preferably the anode supply source, and the suppressor grids are connected to the cathode. The control grids of tubes 24 and 26 are returned to source of a negative bias potential through resistors 32 and 34, respectively. The control grid of tube 26 is coupled to the anode of tube 24 by the parallel resistor-capacitor network 36. Similarly, the control grid of tube 24 is coupled to the anode of tube 26 through the parallel resistor-capacitor network 38. The pulse signals from input #1 are connected to the control grids of tubes 24 and 26 through capacitors 40 and 42. It will be apparent to anyone familiar with Eccles-Jordan circuits that a series of negative pulses supplied at input #1 will cause alternate conduction of tubes 24 and 26.

The Eccles-Jordan circuit supplied by input #2 includes electron tubes 44 and 46 connected in a circuit identical to that described immediately above.

The simplified binary adder circuit shown in Fig. 2 comprises two pentode tubes 48 and 50 having a common anode load impedance 52. Tubes 48 and 50 correspond to tubes 16 and 12, respectively, in Fig. 1, and resistor 52 corresponds to resistor 22 in Fig. 1. The control grid of tube 50 is connected to the ground grid of tube 26. The anode of tube 26 is coupled to the screen grid of tube 48. It will be recognized that the signal at the anode of tube 26 is low when the potential at the grid of this tube is high and that the potential of the anode is high when the potential at the grid is low. Therefore the signals obtained from the control grid and anode, respectively, of tube 26 correspond to the signals obtained at the input #1 and anode of tube 10, respectively, in Fig. 1. Similarly, the control grid of tube 48 is connected to the control grid of tube 44 and the screen grid of tube 50 is directly connected to the anode of tube 44. Since the operation of the circuit of Fig. 2 is similar to that of Fig. 1 if tubes 26 and 44 are considered to correspond to the inverter tubes 10 and 14 of Fig. 1, no detailed description of the operation of the circuit of Fig. 2 will be given.

It should be noted that the circuit of Fig. 1, which provides signals corresponding to the binary sum and the binary product of two input signals, employs only four electron tubes and three resistors. This should be compared to the typical circuit mentioned above which employs six electron tubes, fifteen resistors and four capacitors. The reduction in the number of electron tubes contributes greatly to the reliability of the circuit and, incidentally, reduces the cost of manufacture of the circuit. The reduction in the number of resistors and capacitors also increases the reliability and reduces the cost of manufacture of the circuit. The simplified circuit of Fig. 2, which may be employed whenever the other circuits included within the computer or other device involved in the particular application provide appropriate signals, comprises only two electron tubes and one resistor, and therefore provides an even greater saving in the number of components and the corresponding increase in the reliability of the system.

Certain possible modifications of the circuits shown have been mentioned in connection with the description of Figs. 1 and 2. Another obvious modification would be to duplicate the circuits of Figs. 1 and 2 by substituting transistors or magnetic gates for the vacuum tubes. It will be recognized that still other changes and modifications may be made in the embodiments shown without departing from the spirit and scope of the hereinafter appended claims.

What is claimed is:

1. A circuit for providing indications of the correspondence of two bivalued signals, said circuit comprising: first and second electron tubes, each having at least an anode, a cathode, a control grid and a screen grid, a source of anode potential having at least a positive and a negative terminal, the cathodes of said first and second electron tubes being connected directly to said negative terminal, an anode load resistor having one terminal thereof connected to said positive terminal and the other terminal thereof connected to both of said anodes, first and second signal inverter stages, each of said stages comprising an electron tube having at least an anode, a cathode and a control grid, means connecting said cathode to a point of fixed potential and an anode load resistor connecting said anode to a source of positive potential, the anode of said electron tube in said first inverter stage being connected directly to the screen grid of said first electron tube, the anode of said electron tube in said second inverter stage being connected directly to the screen grid of said second electron tube, means for supplying one of said bivalued signals to said control grid of said electron tube in said first inverter stage and to said control grid of said second electron tube, means for supplying the other bivalued signal to the control grid of said electron tube in said second inverter stage and to said control grid of said first electron tube, and means for deriving an output signal from the anode of at least one of said four electron tubes.

2. A circuit for providing indications of the correspondence of two bivalued signals, said circuit comprising: first and second electron tubes, each having at least an anode, a cathode, a control grid, a screen grid and a suppressor grid, said suppressor grid being connected directly to said cathode, a source of anode potential having a positive and negative terminal, said cathode of said two electron tubes being connected directly to said negative terminal, an anode load resistor having one terminal thereof connected to said positive terminal and the other terminal thereof connected to both of said anodes, first and second signal inverter stages, each of said stages comprising an electron tube having at least an anode, a cathode, a control grid, a screen grid, and a suppressor grid, said suppressor grid being connected directly to said cathode, said screen grid being connected directly to said positive terminal, said cathode being connected directly to said negative terminal and an anode load resistor connecting said anode to said positive terminal, said anode of said electron tube in said first inverter stage being connected directly to said screen grid of said first electron tube, said anode of said electron tube in said second inverter stage being connected directly to the screen grid of said second electron tube, means for supplying one of said bivalued signals directly to said control grid of said electron tube in said first inverter stage and directly to said control grid of said second electron tube, means for supplying the other of said bivalued signals directly to the control grid of said electron tube in said second inverter stage and directly to said control grid of said first electron tube, and means for deriving an output signal from the anode of at least one of said four electron tubes.

3. A simplified circuit for providing an indication of the binary sum and binary product of two bivalued signals, said circuit comprising; first and second electron tubes, each having at least an anode, a cathode, a control grid, a screen grid and a suppressor grid, said suppressor grid being connected directly to said cathode, a source of anode potential having a positive and negative terminal, said cathode of said two electron tubes being connected directly to said negative terminal, an anode load resistor having one terminal thereof connected to said positive terminal and the other terminal thereof connected to both of said anodes, first and second signal inverter stages, each of said stages comprising an electron tube having at least an anode, a cathode, a control grid, a screen grid, and a suppressor grid, said suppressor grid being connected directly to said cathode, said screen grid being connected directly to said positive terminal, said cathode being connected directly to said negative terminal and an anode load resistor connecting said anode to said positive terminal, said anode of said electron tube in said first inverter stage being connected directly to said screen grid of said first electron tube, said anode of said electron tube in said second inverter stage being connected directly to the screen grid of said second electron tube, the anode load resistor in each of said inverter stages having a value such that a positive signal on the control grid of said inverter stage causes the potential of the screen grid of the one of the first-mentioned two tubes associated therewith to be substantially at or below anode current cut-off potential, means for supplying one of said bivalued signals directly to said control grid of said electron tube of said first inverter stage and directly to said control grid of said second electron tube, means for supplying the other of said bivalued signals directly to the control grid of said electron tube in said second inverter stage and directly to said control grid of said first electron tube, and means for deriving an output signal from the anode of at least one of said four electron tubes, the signal at the anodes of said first and second tubes being binary sums of said two bivalued signals and the signal at the anodes of said inverter stages being indicative of the binary product of said two bivalued signals.

4. A circuit for providing indications of the correspondence of two bivalued signals, said circuit comprising: first and second electron tubes, each having at least an anode, a cathode, a control grid, a screen grid and a suppressor grid, said suppressor grid being connected directly to said cathode, a source of anode potential having a positive and negative terminal, said cathode of said two electron tubes being connected directly to said negative terminal, an anode load resistor having one terminal thereof connected to said positive terminal and the other terminal thereof connected to both of said anodes, first and second signal inverter stages, each of said stages comprising an electron tube having at least an anode, a cathode, a control grid, a screen grid, and a suppressor grid, said suppressor grid being connected directly to said cathode, said screen grid being connected directly to said positive terminal, said cathode being connected directly to said negative terminal and an anode load resistor connecting said anode to said positive terminal, said anode of said electron tube in said first inverter stage being connected directly to said screen grid of said first electron tube, said anode of said electron tube in said second inverter stage being connected directly to the screen grid of said second electron tube, means for supplying one of said bivalued signals directly to said control grid of said electron tube in said first inverter stage and directly to said control grid of said second electron tube, means for supplying the other of said bivalued signals directly to the control grid of said electron tube in said second inverter stage and directly to said control grid of said first electron tube, and a voltage level detector circuit associated with the anode of the electron tube in one of said inverter stages, said voltage level detector circuit providing at least a first output signal when the anode with which it is associated is at the potential of said positive terminal and a second output signal when the anode with which it is associated is at a potential less than that of said positive terminal.

References Cited in the file of this patent

UNITED STATES PATENTS

| | | |
|---|---|---|
| 2,207,048 | Campbell | July 9, 1940 |
| 2,226,459 | Bingley | Dec. 24, 1940 |
| 2,590,950 | Eckert, Jr., et al. | Apr. 1, 1952 |
| 2,615,127 | Edwards | Oct. 21, 1952 |